(12) United States Patent
Long et al.

(10) Patent No.: US 11,513,435 B2
(45) Date of Patent: Nov. 29, 2022

(54) QUICK RELEASE PROJECTOR SCREEN

(71) Applicants: Yinhua Long, Guangdong (CN); Zhijun Rong, Guangdong (CN)

(72) Inventors: Yinhua Long, Guangdong (CN); Zhijun Rong, Guangdong (CN)

(73) Assignee: Shenzhen Century-star Visual Co., Ltd, Shenzhen (CN)

( * ) Notice: Subject to any disclaimer, the term of this patent is extended or adjusted under 35 U.S.C. 154(b) by 322 days.

(21) Appl. No.: 16/891,058

(22) Filed: Jun. 3, 2020

(65) Prior Publication Data
US 2020/0292930 A1    Sep. 17, 2020

(51) Int. Cl.
*G03B 21/58* (2014.01)
*A47G 5/00* (2006.01)

(52) U.S. Cl.
CPC ............. *G03B 21/58* (2013.01); *A47G 5/00* (2013.01)

(58) Field of Classification Search
CPC ........... G03B 21/58; G03B 21/56; A47G 5/00
See application file for complete search history.

(56) References Cited

U.S. PATENT DOCUMENTS

| | | | | |
|---|---|---|---|---|
| 8,024,881 B2* | 9/2011 | Redmon | ................ | G09F 19/18 40/607.04 |
| 10,474,024 B2* | 11/2019 | Mathieson | ............ | G03B 21/56 |
| 2010/0079860 A1* | 4/2010 | Unno | ..................... | G03B 21/58 359/443 |

FOREIGN PATENT DOCUMENTS

| | | | | | |
|---|---|---|---|---|---|
| CN | 106292156 A | * | 1/2017 | ............ | G03B 21/56 |
| CN | 114236961 A | * | 3/2022 | ............ | G03B 21/58 |
| GB | 153724 A | * | 11/1920 | ............ | G03B 21/58 |

* cited by examiner

*Primary Examiner* — Christopher E Mahoney

(57) ABSTRACT

A quick release projector screen includes a rectangular frame; two folding posts secured to a rear end of the frame using a plurality of first screws; and a screen attached to a front end of the frame using the first screws. There are further provided two first folding mechanisms disposed on each of top and bottom of the frame, two second folding mechanisms disposed on either side of the frame respectively, and two third folding mechanisms disposed on either post.

1 Claim, 9 Drawing Sheets

QUICK RELEASE PROJECTOR SCREEN

BACKGROUND OF THE INVENTION

1. Field of the Invention

The invention relates to projector screens and more particularly to a quick release projector screen.

2. Description of Related Art

Commercially available projector screens are not portable due to bulkiness and thus they are inconvenient to carry in case of need. While most conventional projector screens are foldable, they are not easy to assemble prior to use. Further, it is time consuming to assemble a projector screen. Furthermore, the assembled projector screen is not secured due to unreliable connections of parts. And in turn, the surface is not flat. As a result, people watching projected images on the surface are not satisfied with its effect.

Thus, the need for improvement still exists.

SUMMARY OF THE INVENTION

The invention has been made in an effort to solve the problems of the conventional art including time consuming assembly and unreliable structure by providing a quick release projector screen having novel and nonobvious characteristics including reliable structure and easy assembly.

To achieve above and other objects of the invention, the invention provides a projector screen comprising a rectangular frame; two folding posts secured to a rear end of the frame using a plurality of first screws; and a screen attached to a front end of the frame using the first screws.

Preferably, further comprises two first folding mechanisms disposed on each of top and bottom of the frame.

Preferably, the first folding mechanism includes two opposite aluminum tubes, a first tubular joining member at an end of one aluminum tube, a second tubular joining member at an end of the other aluminum tube facing the first tubular joining member, a plurality of first rivets for securing one aluminum tube to the first tubular joining member and for securing the other aluminum tube to the second tubular joining member, a first torsion spring disposed in the first tubular joining member, and a pivotal lever disposed with the first torsion spring to mount on the first tubular joining member.

Preferably, further comprises two second folding mechanisms disposed on either side of the frame respectively.

Preferably, the second folding mechanism includes two opposite aluminum tubes, two first joining plates secured to either side of an end of one aluminum tube using a plurality of second rivets, a first fastening member fastened between the first joining plates using a third rivet, two second joining plates secured to either side of an end of the other aluminum tube using a plurality of fourth rivets, a second fastening member fastened between the second joining plates using a fifth rivet, and a sixth rivet driven through the second joining plates, the first and second fastening members, and two sleeves to join them.

Preferably, further comprises two third folding mechanisms disposed on either post Preferably, the third folding mechanism includes two opposite aluminum tubes, a first clip disposed in an end of one aluminum tube using seventh rivets, a second clip disposed in an end of the other aluminum tube using a plurality of eighth rivets, two joining plate members fastened on two sides of an end of the first clip respectively using a plurality of ninth rivets and another two joining plate members fastened on two sides of an end of the second clip respectively using a plurality of tenth rivets, an eleventh rivet driven through the joining plate members and a sleeve to join them, and a push button disposed on the second clip.

Preferably, the second folding mechanism further comprises a second torsion spring mounted between the first fastening member and the second fastening member.

Preferably, the first clip is complimentarily engaged with and the second clip.

Preferably, further comprises a washer fastened between the push button and the second clip, and a third torsion spring disposed under the second clip to urge the second clip upward wherein the push button is directly above the third torsion spring.

The invention has the following advantageous effects in comparison with the prior art: disassembly or disassembly is easy and saving time. Its structure is strong and reliable.

The above and other objects, features and advantages of the invention will become apparent from the following detailed description taken with the accompanying drawings.

DETAILED DESCRIPTION OF THE INVENTION

Figure 1:
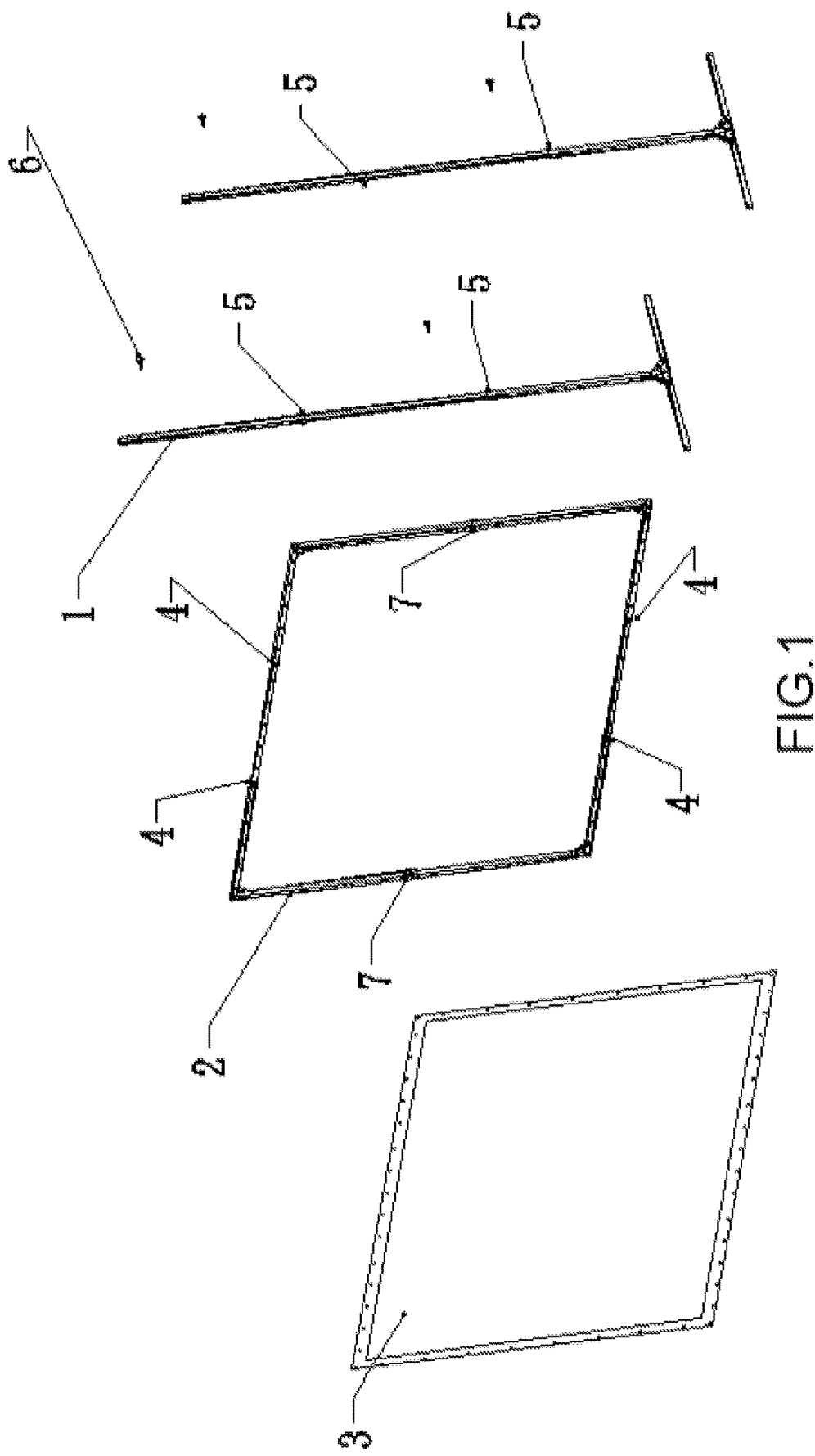
FIG. 1 is an exploded view of a quick release projector screen according to a first preferred embodiment of the invention.
Figure 2:
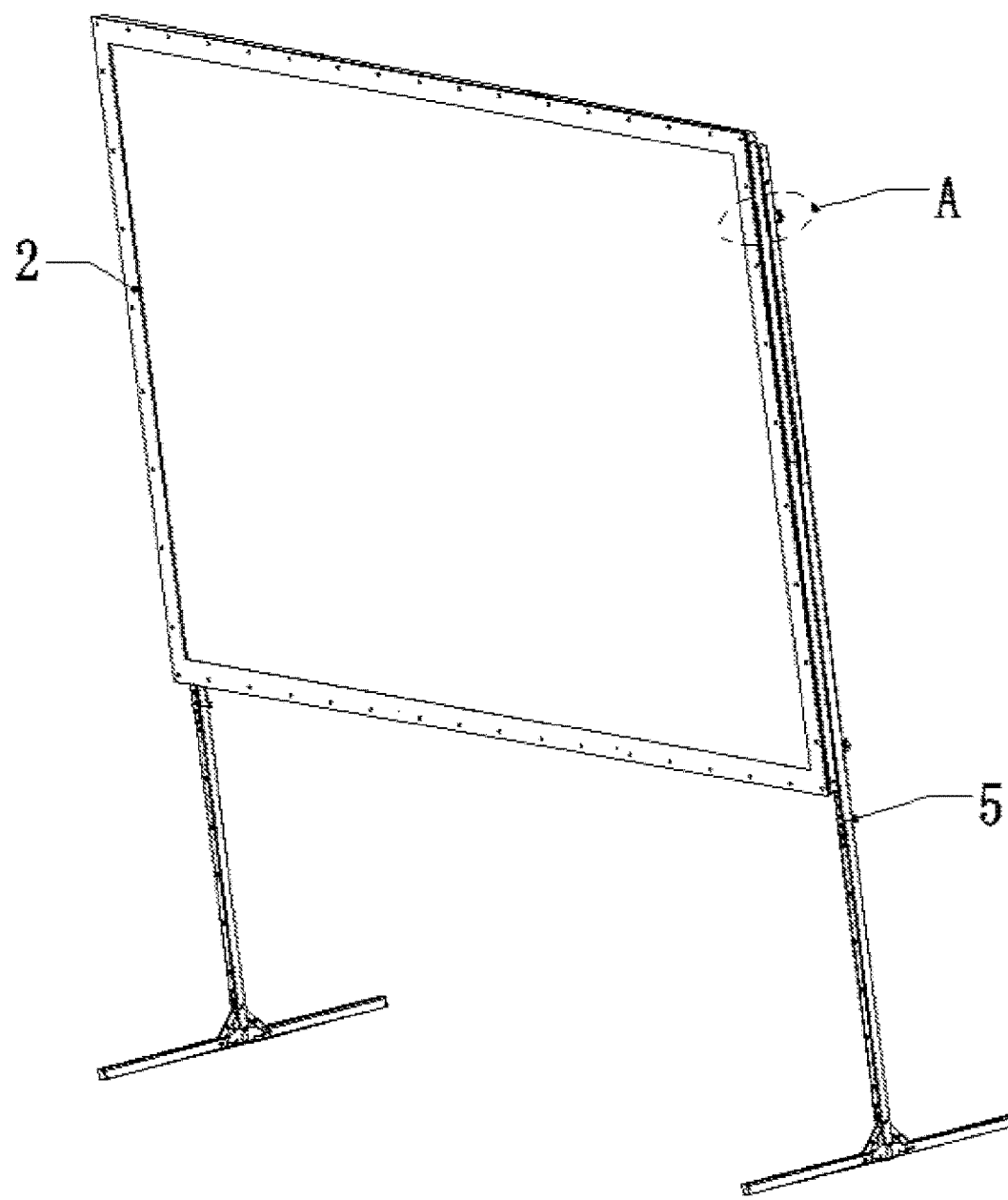
FIG. 2 is a perspective view of the assembled projector screen.
Figure 3:
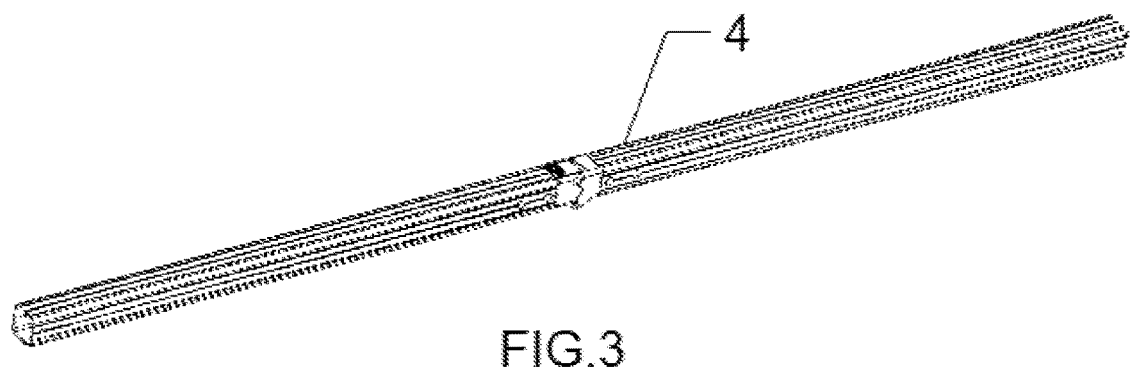
FIG. 3 is a perspective view of the first folding mechanism.
Figure 4:
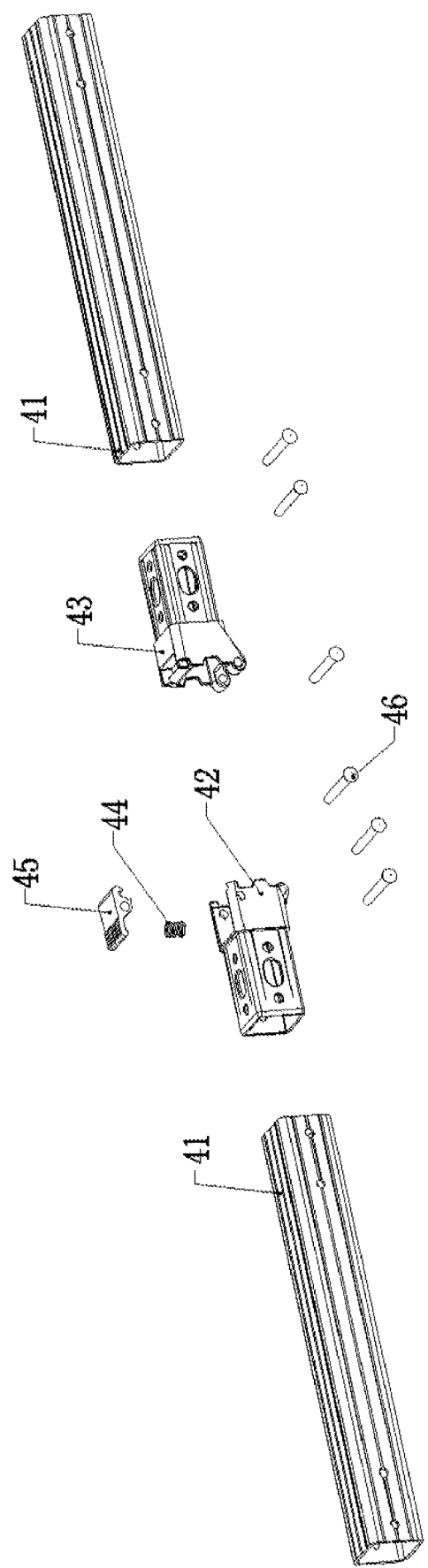
FIG. 4 is an exploded view of the first folding mechanism.
Figure 5:
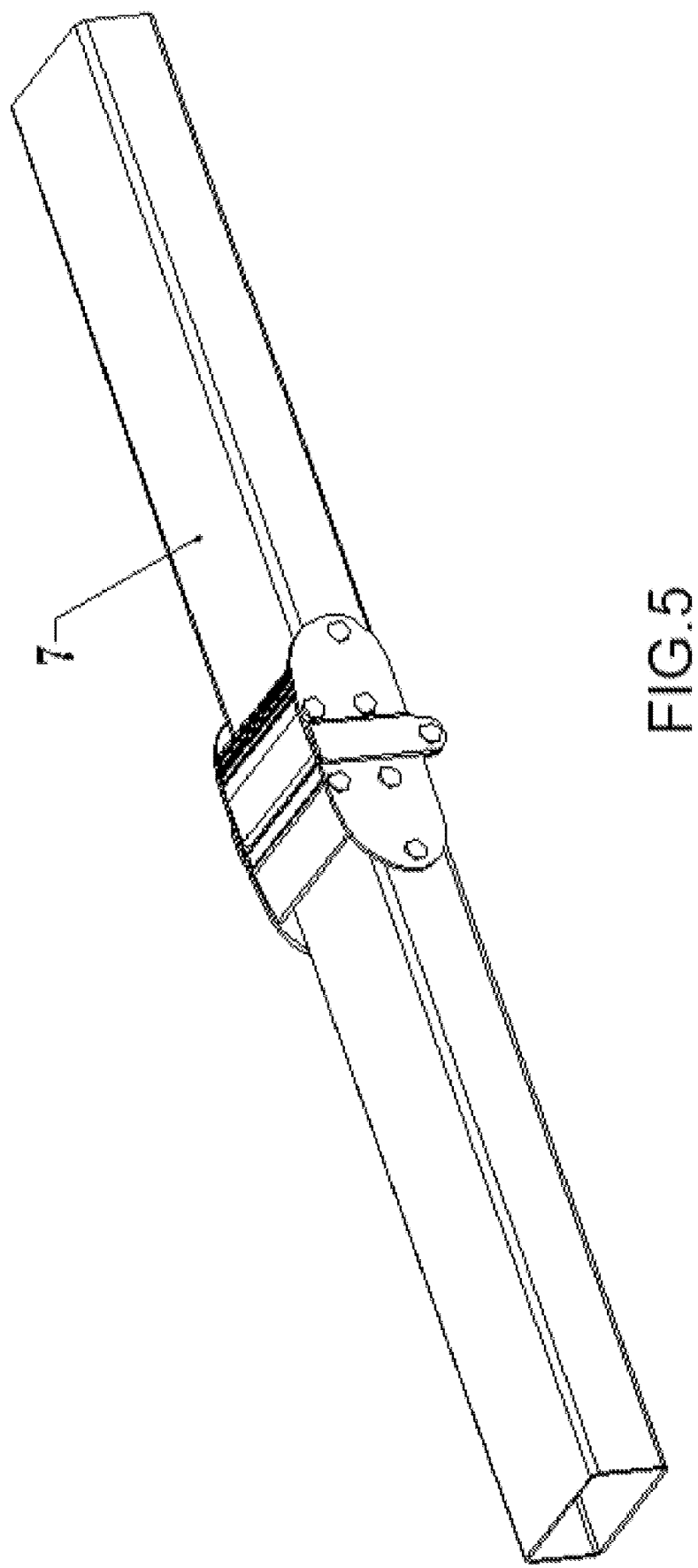
FIG. 5 is a perspective view of the second folding mechanism.
Figure 6:
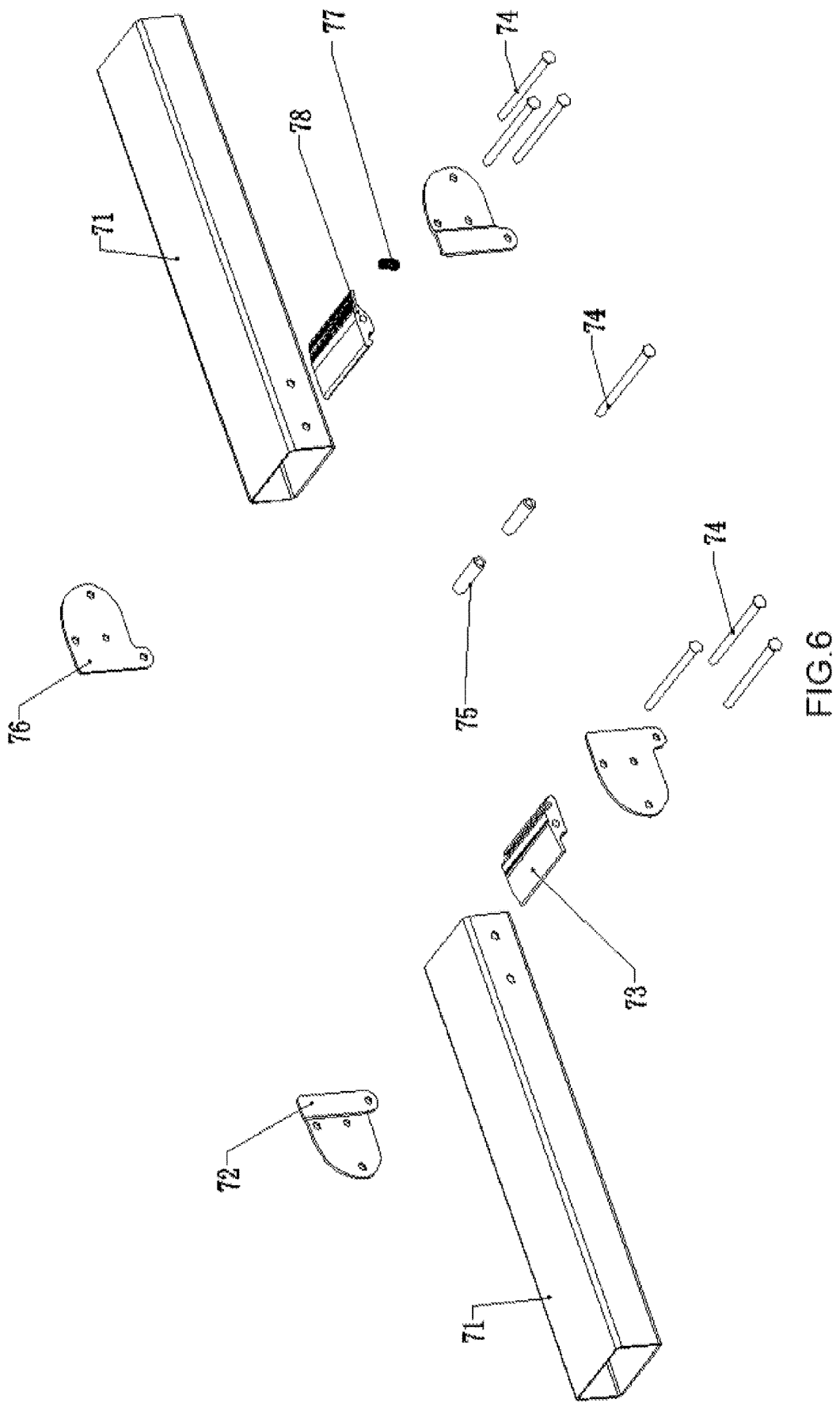
FIG. 6 is an exploded view of the second folding mechanism.
Figure 7:
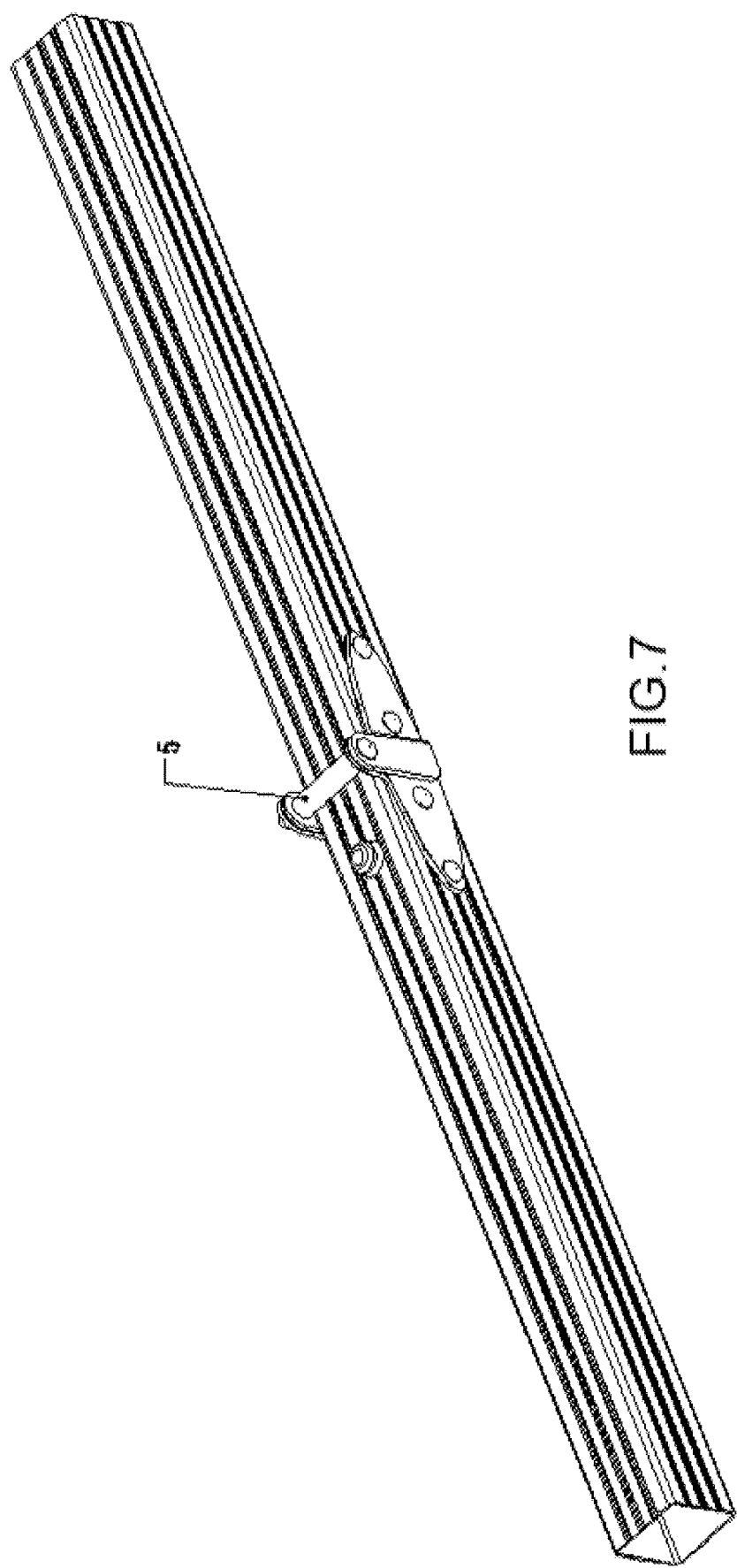
FIG. 7 is a perspective view of the third folding mechanism.
Figure 8:
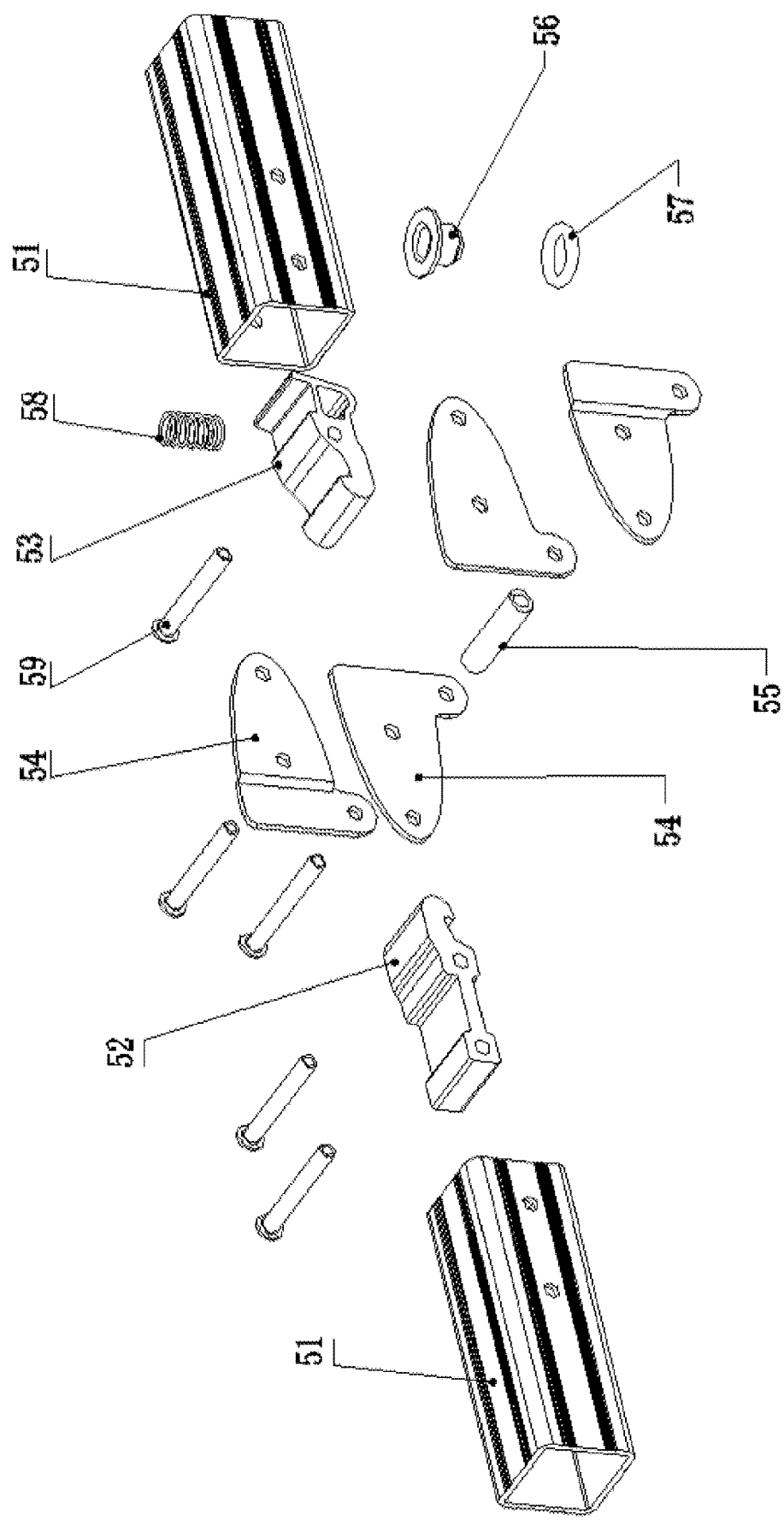
FIG. 8 is an exploded view of the third folding mechanism.
Figure 9:
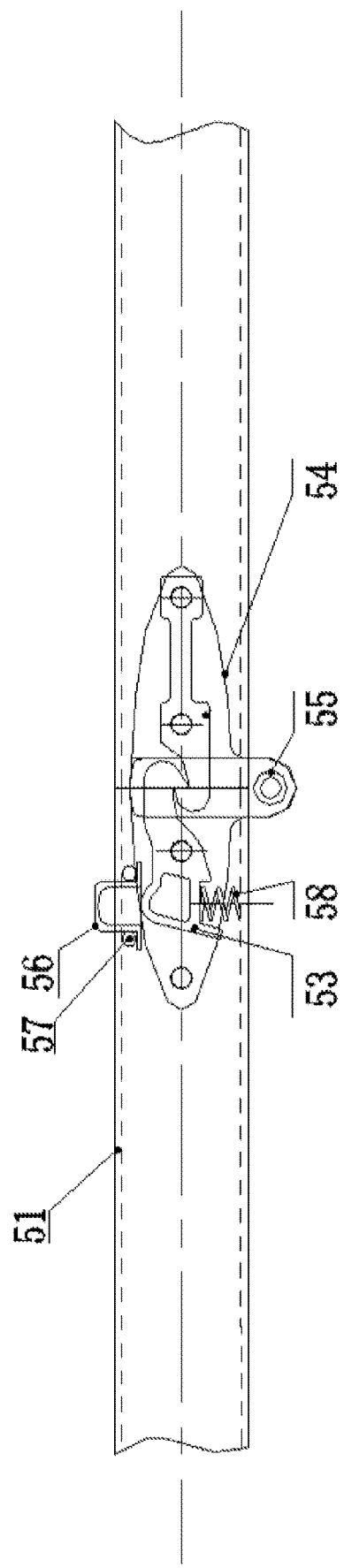
FIG. 9 is a schematic longitudinal sectional view of the third folding mechanism.
Figure 10:
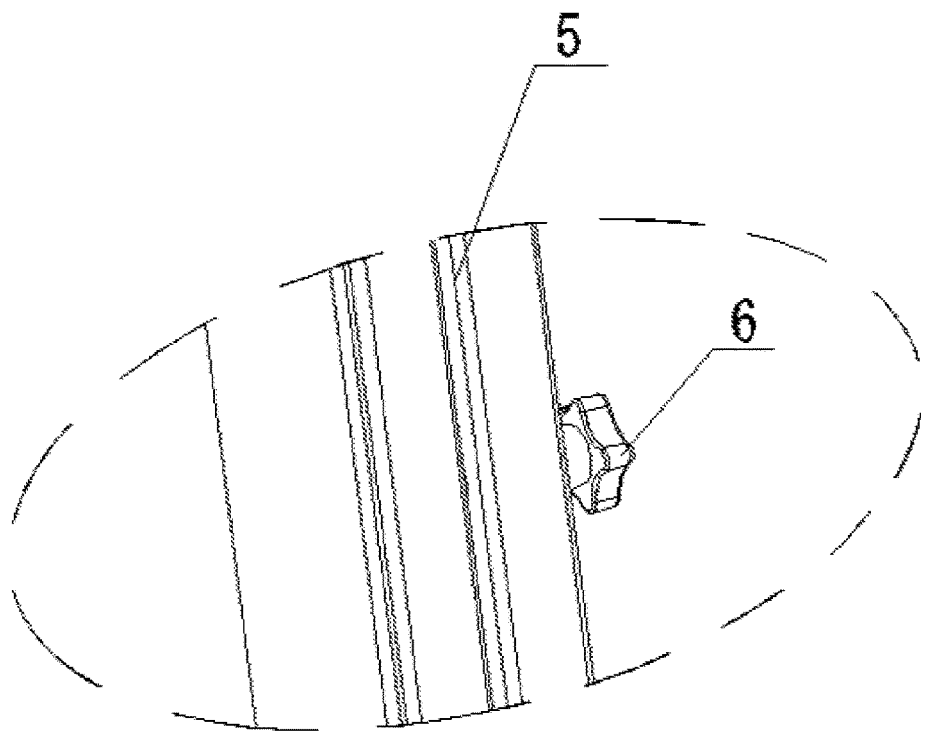
FIG. 10 is a detailed view of the area in circle A of FIG. 2.

Referring to FIGS. 1 to 10, a quick release projector screen in accordance with a first preferred embodiment of the invention comprises a rectangular frame 2, two folding posts 1 secured to a rear end of the frame 2 using screws 6, and a screen 3 attached to a front end of the frame 2 using the screws 6.

Two first folding mechanisms 4 are provided on top of the frame 2 and another two first folding mechanisms 4 are provided on bottom of the frame 2. The first folding mechanism 4 includes two opposite aluminum tubes 41, a first tubular joining member 42 at an end of one aluminum tube 41, a second tubular joining member 43 at an end of the other aluminum tube 41 facing the first tubular joining member 42, a plurality of rivets 46 for securing one aluminum tube 41 to the first tubular joining member 42 and for securing the other aluminum tube 41 to the second tubular joining member 43, a torsion spring 44 provided in the first tubular joining member 42, and a pivotal lever 45 provided with the torsion spring 44 to mount on the first tubular joining member 42, i.e., the pivotal lever 45 being spring biased.

Thus, a pressing of the pivotal lever 45 can pivot the pivotal lever 45 and compress the torsion spring 44 to disengage the first tubular joining member 42 from the second tubular joining member 43. As a result, the aluminum tubes 41 can be disengaged.

Two second folding mechanisms 7 are provided on either side of the frame 2 respectively. The second folding mechanism 7 includes two opposite aluminum tubes 71, two first joining plates 72 secured to either side of an end of one aluminum tube 71 using rivets 74, a first fastening member 73 fastened between the first joining plates 72 using a rivet 74, two second joining plates 76 secured to either side of an end of the other aluminum tube 71 using rivets 74, a second fastening member 78 fastened between the second joining plates 76 using a rivet 74, a rivet 74 driven through the second joining plates 76, the first and second fastening members 73, 78, and two sleeves 75 to join them, and a torsion spring 77 mounted between the first fastening member 73 and the second fastening member 78, i.e., the first and second fastening members 73, 78 being spring biased.

Thus, a pressing of the second fastening member 78 can pivot the second fastening member 78 and compress the torsion spring 77 to disengage the second fastening member 78 from the first fastening member 73. As a result, the aluminum tubes 71 can be folded.

Two third folding mechanisms 5 are provided on either post 1. The third folding mechanism 5 includes two opposite aluminum tubes 51, a first clip 52 provided in an end of one aluminum tube 51 using rivets 59, a second clip 53 provided in an end of the other aluminum tube 51 using rivets 59 and complimentarily engaged with the first clip 52, two joining plate members 54 fastened on two sides of an end of the first clip 52 respectively using rivets 59 and another two joining plate members 54 fastened on two sides of an end of the second clip 52 respectively using rivets 59, a rivet 59 driven through the joining plate members 54 and a sleeve 55 to join them, a push button 56 provided on the second clip 53, a washer 57 fastened between the push button 56 and the second clip 53, and a torsion spring 58 provided under the second clip 53 to urge the second clip 53 upward wherein the push button 56 is directly above the torsion spring 58.

Thus, a pressing of the push button 56 can pivot the second clip 53 and compress the torsion spring 58 to disengage the second clip 53 from the first clip 52. As a result, the aluminum tubes 51 can be folded.

Figure 11:
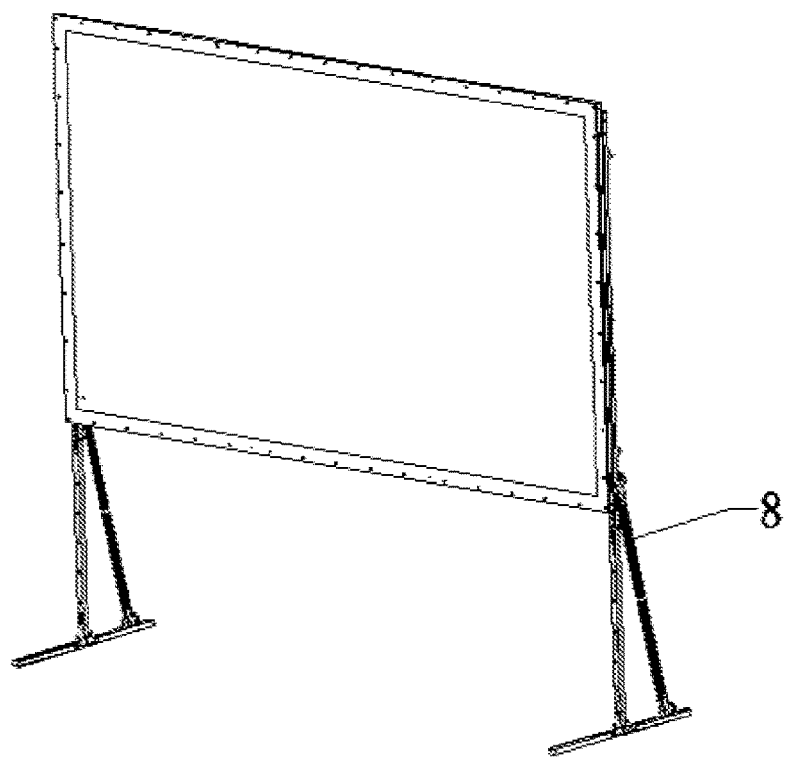
FIG. 11 is a perspective view of a quick release projector screen according to a second preferred embodiment of the invention.

Referring to FIG. 11, a quick release projector screen in accordance with a second preferred embodiment of the invention is shown. The characteristics of the second preferred embodiment are substantially the same as that of the first preferred embodiment except the following: two bracing rods 8 are provided and each bracing rod 8 has one end fastened at either bottom end of the frame 2 and extended at an angle of 30-degree with respect to the post 1.

The invention has the following advantageous effects in comparison with the prior art: disassembly or disassembly is easy and saving time. Its structure is strong and reliable.

While the invention has been described in terms of preferred embodiments, those skilled in the art will recognize that the invention can be practiced with modifications within the spirit and scope of the appended claims.

What is claimed is:

1. A projector screen comprising:
   a rectangular frame (2);
   two folding posts (1) secured to a rear end of the frame (2) using a plurality of first screws (6);
   a screen (3) attached to a front end of the frame (2) using the first screws (6);
   two first folding mechanisms (4) disposed on each of top and bottom of the frame (2) wherein the first folding mechanism (4) includes two opposite aluminum tubes (41), a first tubular joining member (42) at an end of one aluminum tube (41), a second tubular joining member (43) at an end of the other aluminum tube (41) facing the first tubular joining member (42), a plurality of first rivets (46) for securing one aluminum tube (41) to the first tubular joining member (42) and for securing the other aluminum tube (41) to the second tubular joining member (43), a first torsion spring (44) disposed in the first tubular joining member (42), and a pivotal lever (45) disposed with the first torsion spring (44) to mount on the first tubular joining member (42);
   two second folding mechanisms (7) disposed on either side of the frame (2) respectively wherein the second folding mechanism (7) includes two opposite aluminum tubes (71), two first joining plats (72) secured to either side of an end of one aluminum tube (71) using a plurality of second rivets (74), a first fastening member (73) fastened between the first joining plates (72) using a third rivet (74), two second joining plats (76) secured to either side of an end of the other aluminum tube (71) using a plurality of fourth rivets (74), a second fastening member (78) fastened between the second joining plates (76) using a fifth rivet (74), and a sixth rivet (74) driven through the second joining plates (76), the first and second fastening members (73, 78), and two first sleeves (75) to join them;
   two third folding mechanisms (5) disposed on either post (1) wherein the third folding mechanism (5) includes two opposite aluminum tubes (51), a first clip (52) disposed in an end of one aluminum tube (51) using a plurality of seventh rivets (59), a second clip (53) disposed in an end of the other aluminum tube (51) using a plurality of eighth rivets (59), two joining plate members (54) fastened on two sides of an end of the first clip (52) respectively using a plurality of ninth rivets (59) and another two joining plate members (54) fastened on two sides of an end of the second clip (52) respectively using a plurality of tenth rivets (59), an eleventh rivet (59) driven through the joining plate members (54) and a second sleeve (55) to join them, and a push button (56) disposed on the second clip (53); wherein the second folding mechanism (7) further comprises a second torsion spring (77) mounted between the first fastening member (73) and the second fastening member (78); and wherein the first clip (52) is complimentarily engaged with and the second clip (53); and
   a washer (57) fastened between the push button (56) and the second clip (53), and a third torsion spring (58) disposed under the second clip (53) to urge the second clip (53) upward wherein the push button (56) is directly above the third torsion spring (58).

* * * * *